United States Patent
Minei et al.

(10) Patent No.: US 11,002,963 B2
(45) Date of Patent: May 11, 2021

(54) HEAD-UP DISPLAY DEVICE

(71) Applicant: Toyota Jidosha Kabushiki Kaisha, Toyota (JP)

(72) Inventors: Taichi Minei, Toyota (JP); Shigeto Muramatsu, Toyota (JP); Yasunobu Nagata, Toyota (JP); Norihisa Nomura, Ogaki (JP); Takashi Tsuboi, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/791,164

(22) Filed: Feb. 14, 2020

(65) Prior Publication Data

US 2020/0271926 A1    Aug. 27, 2020

(30) Foreign Application Priority Data

Feb. 26, 2019 (JP) .............................. JP2019-033235

(51) Int. Cl.
    *G02B 27/01* (2006.01)
    *B60R 1/00* (2006.01)

(52) U.S. Cl.
    CPC .......... *G02B 27/0101* (2013.01); *B60R 1/001* (2013.01); *G02B 27/0149* (2013.01); *B60R 2300/205* (2013.01); *B60Y 2400/92* (2013.01); *G02B 2027/0187* (2013.01)

(58) Field of Classification Search
    CPC ............ G02B 27/0101; G02B 27/0149; G02B 2027/0187; B60R 1/001; B60R 2300/205; B60Y 2400/92; B60K 35/00; B60K 2370/1579; B60K 2370/816; B62D 25/081

See application file for complete search history.

(56) References Cited

U.S. PATENT DOCUMENTS

| 2015/0091331 A1* | 4/2015 | Takei ..................... B60R 21/34 |
| | | 296/192 |
| 2017/0059864 A1 | 3/2017 | Takahashi |
| 2018/0045958 A1 | 2/2018 | Kuzuhara et al. |
| 2020/0269694 A1* | 8/2020 | Minei ................ G02B 27/0149 |

FOREIGN PATENT DOCUMENTS

| JP | 2010-064708 A | 3/2010 |
| JP | 2010-064709 A | 3/2010 |
| JP | 2014-156219 A | 8/2014 |

OTHER PUBLICATIONS

U.S. Appl. No. 16/789,894, filed Feb. 13, 2020; Inventors: Taichi Minei et al.

\* cited by examiner

*Primary Examiner* — Stephen G Sherman
(74) *Attorney, Agent, or Firm* — Dinsmore & Shohl LLP (57) ABSTRACT

A head-up display device includes a casing provided inside an instrument panel. The casing includes an upper case constituting an upper part of the casing and provided with a fragile portion that is configured to be broken when an impact load is input to the casing from an upper side in a vehicle up-down direction, and a lower case constituting a lower part of the casing, provided with a light source unit configured to emit image information, and having a rigidity higher than that of the upper case.

8 Claims, 6 Drawing Sheets

HEAD-UP DISPLAY DEVICE

CROSS-REFERENCE TO RELATED APPLICATIONS

This application claims priority to Japanese Patent Application No. 2019-033235 filed on Feb. 26, 2019, which is incorporated herein by reference in its entirety including the specification, drawings and abstract.

BACKGROUND

1. Technical Field

The disclosure relates to a head-up display device.

2. Description of Related Art

Japanese Unexamined Patent Application Publication No. 2010-064709 (JP 2010-064709 A) describes a technique regarding a head-up display device in which a fixing member is provided that protrudes from a lower part of a side wall of a housing (hereinafter referred to as "casing") and that is connected to a bracket provided on a vehicle body. The fixing member includes a support portion supported by the bracket, a fastening portion fastened to the bracket, and a connecting portion connecting the support portion and the side wall of the casing. The connecting portion is provided with a groove and a bottom side of the groove serves as a thin portion.

The thin portion is configured to be broken when a predetermined external force is applied to the casing, and the connection between the casing and the bracket is released with the breakage of the thin portion. Thus, when the thin portion is broken, the head-up display device moves downward in a vehicle up-down direction. Thereby, a front windshield and the like move downward in the vehicle up-down direction, which enables absorption of an impact energy.

Japanese Unexamined Patent Application Publication No. 2014-156219 (JP 2014-156219 A) describes a technique regarding a head-up display device in which a plurality of fragile portions with a smaller thickness (hereinafter referred to as "thin portions") are provided in corners, steps, and the like of a lower case constituting a lower part of a casing. In the head-up display device, when an impact load is input from above a vehicle, the thin portions are broken and the casing is crushed so that an impact energy can be absorbed.

As described above, in the related art, the thin portions are provided in the fixing member supporting the casing of the head-up display device or in the lower case of the head-up display device. Thus, by causing the thin portions to be broken, it is possible to absorb the impact energy.

SUMMARY

In general, a light source unit that emits image information is disposed at a lower part (in the lower case) of the head-up display device. Therefore, when the thin portions are provided to make the fixing member for the head-up display or the lower case of the head-up display device fragile as described above, the image information emitted from the light source unit may jitter due to vibration of the vehicle during traveling, such as road surface input.

The disclosure provides a head-up display device that suppresses jitters of image information during traveling of a vehicle and can absorb an impact energy when an impact load is input from above the vehicle.

A first aspect of the disclosure relates to a head-up display device including a casing provided inside an instrument panel. The casing includes an upper case constituting an upper part of the casing and provided with a fragile portion that is configured to be broken when an impact load is input to the casing from an upper side in a vehicle up-down direction, and a lower case constituting a lower part of the casing, provided with a light source unit configured to emit image information, and having a rigidity higher than that of the upper case.

In the head-up display device according the above aspect, the casing may be provided with a concave mirror configured to project the image information emitted from the light source unit onto a front windshield glass.

In the head-up display device of the above aspect, the casing of the head-up display device is provided inside the instrument panel, and the casing is provided with the concave mirror that projects the image information emitted from the light source onto the front windshield glass.

Further, the upper case constituting the upper part of the casing is provided with the fragile portion. The fragile portion is configured to be broken when the impact load is input to the casing (the head-up display device) from the upper side in the vehicle up-down direction. The lower case constituting the lower part of the casing is provided with the light source unit that emits the image information. The lower case is formed to have higher rigidity than the upper case.

In the above aspect, the lower case provided with the light source unit is formed to have high rigidity, so that it is possible to suppress jitters of the image information in the head-up display device during traveling of the vehicle.

Further, in the above aspect, when the impact load is input to the casing from the upper side in the vehicle up-down direction, the fragile portion of the upper case receives a reaction force from the lower case to be broken. As a result, the front windshield glass, the instrument panel, and the like can move (deform) downward in the vehicle up-down direction without being intercepted by the upper case of the head-up display device, so as to absorb the impact energy.

In the head-up display device according to the above aspect, the upper case may have, as the fragile portion, a thin portion provided at least at a part of the upper case on a front side in a vehicle front-rear direction and having a plate thickness smaller than that of a remaining part of the upper case.

In the head-up display device of the above aspect, the upper case has, as the fragile portion, the thin portion provided at least at the part of the upper case on the front side in the vehicle front-rear direction (front part of the upper case) and having the plate thickness smaller than that of the remaining part of the upper case. This thin portion is formed, for example, by providing a groove in the upper case.

Thus, the thin portion is provided, so that the portion provided with the thin portion has the smaller plate thickness than the remaining portion, and has accordingly lower rigidity than the remaining portion. As a result, when the impact load is input to the head-up display device (casing) from the upper side in the vehicle up-down direction, the thin portion is broken.

In general, the front windshield glass is tilted toward the rear side in the vehicle front-rear direction as extending toward the upper side in the vehicle up-down direction. Therefore, a distance between the front windshield glass and the front part of the upper case in the vehicle front-rear direction (front part of the head-up display device) is shorter than a distance between the front windshield glass and the rear part of the upper case in the vehicle front-rear direction (rear part of the head-up display device).

Thus, the fragile portion is provided at least at the front part of the upper case, so that when the impact load is input to the front windshield glass from the upper side in the vehicle up-down direction, the fragile portion can be broken at an early stage, compared to the case where the fragile portion is provided at the rear part of the upper case. Thereby, it is possible to deform the front windshield glass, the instrument panel, and the like at an early stage to absorb the impact energy.

In the head-up display device according to the above aspect, the lower case may have a first wall constituting a part of the lower case and extending along the vehicle up-down direction. The upper case may have a second wall constituting a part of the upper case, extending along the vehicle up-down direction, and disposed further inward of the casing than the first wall. The head-up display device may further have a connecting portion at which an upper end of the first wall in the vehicle up-down direction and a lower end of the second wall in the vehicle up-down direction are connected and that is provided with the fragile portion.

In the head-up display device of the above aspect, the first wall constituting a part of the lower case is formed to extend along the vehicle up-down direction. The second wall constituting a part of the upper case is formed to extend along the vehicle up-down direction, and is disposed inward of the first wall of the lower case. The upper end of the first wall of the lower case in the vehicle up-down direction and the lower end of the second wall of the upper case in the vehicle up-down direction are connected at the connecting portion. The connecting portion is provided with the fragile portion.

Here, the upper case is configured to be broken at the fragile portion when the impact load is input to the casing of the head-up display device from the upper side in the vehicle up-down direction. As described above, the second wall of the upper case is disposed inward of the first wall of the lower case, and the upper end of the first wall of the lower case and the lower end of the second wall of the upper case are connected. Thus, when the fragile portion in the connecting portion is broken, the upper case moves toward the lower case (downward in the vehicle up-down direction).

Thus, in the above aspect, the upper case is broken and the volume of the casing is reduced, so that the amounts of deformation (deformation strokes) of the front windshield glass, the instrument panel, and the like can be increased, thereby increasing the amount of impact energy to be absorbed.

In the head-up display device according to the above aspect, the connecting portion may further include a lateral wall extending outward of the second wall from the lower end of the second wall in the vehicle up-down direction and configured to be placed on the upper end of the first wall in the vehicle up-down direction, and a connecting piece extending downward from an end of the lateral wall and overlapping a surface of the first wall, which faces outward of the casing, to be connected to the first wall. The fragile portion may be provided at a boundary portion between the lateral wall and the second wall.

In the head-up display device of the above aspect, the connecting portion further includes the lateral wall and the connecting piece. The lateral wall extends outward of the second wall from the lower end, in the vehicle up-down direction, of the second wall of the upper case, and can be placed on the upper end, in the vehicle up-down direction, of the first wall of the lower case. The connecting piece extends downward from the end of the lateral wall, overlaps the first wall of the lower case, which faces outward of the casing, and is connected to the first wall. The fragile portion is provided in the boundary portion between the lateral wall and the second wall of the upper case.

Thus, the fragile portion is provided in the boundary portion between the lateral wall and the second wall of the upper case. Therefore, when an impact load is input to the casing from the upper side in the vehicle up-down direction, a stress can be concentrated on the fragile portion, so that the fragile portion can be reliably broken. The lateral wall of the upper case does not necessarily need to be placed on the upper end of the first wall of the lower case in the vehicle up-down direction.

In the head-up display device according to the above aspect, at a front part of the front windshield glass in the vehicle front-rear direction, at least the fragile portion may be provided below, in the vehicle up-down direction, a joint portion joining a cowl extending along a vehicle width direction and the front windshield glass.

At the front part of the front windshield glass in the vehicle front-rear direction, an injury index with respect to a pedestrian who collides with the front windshield glass is higher at the joint portion joining the cowl extending along the vehicle width direction and the front windshield glass than at a portion other than the joint portion.

Thus, in the head-up display device of the above aspect, at least the fragile portion is provided below, in the vehicle up-down direction, the joint portion joining the front windshield glass and the cowl. Accordingly, when the impact load is input from the upper side in the vehicle up-down direction to the casing of the head-up display device through the front windshield glass, the fragile portion of the upper case is broken, so that it is possible to promote deformation of the front windshield glass, the instrument panel, the cowl, and the like involving the joint portion.

That is, in the above aspect, it is possible to restrain at least the upper case of the head-up display device from acting as a reaction force below, in the vehicle up-down direction, the joint portion joining the front windshield glass and the cowl, when the front windshield glass, the instrument panel, the cowl, and the like are deformed.

In the head-up display device according to the above aspect, the lower case may accommodate the concave mirror.

In the head-up display device according to the above aspect, the lower case may be configured to accommodate a flat mirror disposed on a path of the image information, which extends from the light source unit that emits the image information to the concave mirror on which the image information is incident, the flat mirror being configured to refract the image information emitted from the light source unit.

In the head-up display device according to the above aspect, the lower case may include a fixing portion that is fixed to a cowl reinforcement of a vehicle.

As described above, the head-up display device of the above aspect provides an effect that jitters of the image information during traveling of the vehicle can be suppressed, and the impact energy can be absorbed when the impact load is input from the upper side in the vehicle up-down direction.

The head-up display device of the above aspect provides an effect that the fragile portion can be broken at an early stage to absorb the impact energy when the impact load is input to the front windshield glass from the upper side in the vehicle up-down direction.

The head-up display device of the above aspect provides an effect that the amounts of deformation of the front windshield glass, the instrument panel, and the like can be increased so that the amount of impact energy to be absorbed can be increased.

The head-up display device of the above aspect provides an effect that, when the impact load is input to the casing from the upper side in the vehicle up-down direction, the fragile portion can be reliably broken.

The head-up display device of the above aspect provides an effect that the reaction force with respect to the pedestrian can be reduced so that the impact which acts on the pedestrian can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
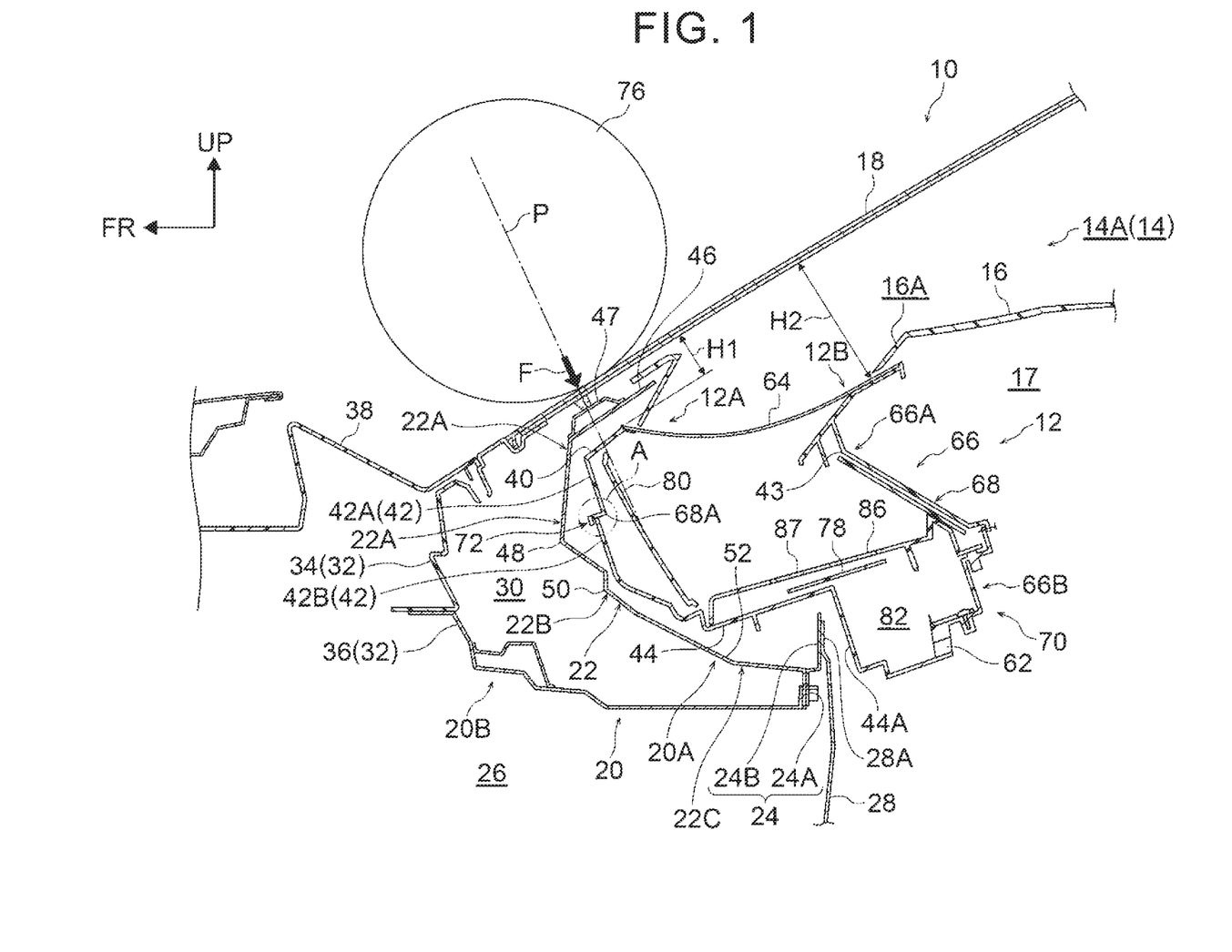
FIG. 1 is a sectional view of a front part of a cabin of a vehicle on which a head-up display device according to an embodiment is mounted, taken along a vehicle up-down direction and a vehicle front-rear direction.

Hereinafter, a head-up display device according to an embodiment of the disclosure will be described with reference to the drawings. Note that an arrow FR appropriately shown in the drawings indicates a front side in a vehicle front-rear direction, and an arrow UP indicates an upper side in a vehicle up-down direction. An arrow OUT indicates an outer side in a vehicle width direction.
Overall Configuration First, a vehicle 10 on which a head-up display device (head-up display device body) 12 is mounted will be described. FIG. 1 is a sectional view of a front part 14A of a cabin 14 of the vehicle 10, taken along the vehicle up-down direction and the vehicle front-rear direction. As shown in FIG. 1, an instrument panel 16 is provided at the front part 14A of the cabin 14 of the vehicle 10.

Although not shown, the instrument panel 16 is attached to a generally columnar instrument panel reinforcement extending between front pillars provided at both ends of the vehicle 10 in the vehicle width direction, and covers a steering column, etc. from an upper side in the vehicle up-down direction.

A front windshield glass 18 is provided above the instrument panel 16. The front windshield glass 18 is supported by a cowl 20 provided forward of the instrument panel 16 so as to extend along substantially the entire region of the vehicle width, upper portions of the front pillars disposed at both ends of the vehicle 10 in the vehicle width direction, and a front header panel (not shown) provided on the upper side of the front pillars so as to extend along the vehicle width direction.

Here, for example, the cowl 20 includes a cowl panel 22 made of a steel sheet. The cowl panel 22 covers a front part 12A of the head-up display device 12 from an outside of the head-up display device 12 and constitutes a rear part 20A of the cowl 20. The cowl panel 22 is welded (connected) to an upper end 28A of a dash panel 28 via a bracket 24 etc. having a crank shape in a side view of the vehicle. The dash panel 28 is made of a steel sheet, extends in both the vehicle up-down direction and the vehicle width direction, and separates a power unit room 26 accommodating a power unit of the vehicle 10 from the cabin 14.

Further, a front part 20B of the cowl 20 is provided with a cowl panel 32 that form, together with the cowl panel 22, a closed section 30 in the side view of the vehicle. Here, the "closed section 30" need not necessarily have a completely closed section structure.

The cowl panel 32 is made from resin, for example, and includes a cowl upper panel 34 that constitutes an upper part of the cowl panel 32 and a cowl lower panel 36 that constitutes a lower part of the cowl panel 32. The cowl upper panel 34 constitutes a part of a cowl louver 38 provided on the front side of the front windshield glass 18 in the vehicle front-rear direction.

The cowl panel 22 is formed so as to cover the front part 12A of the head-up display device 12 from the outside of the head-up display device 12 as described above. Thus, the cowl panel 22 is formed so as to face an upper wall 40, a side wall 42, and a lower wall 44 of the head-up display device 12, and has a generally C shape with its rear part in the vehicle front-rear direction opened in the side view of the vehicle.

Specifically, the upper part 22A of the cowl panel 22 is provided with a support portion 46 that faces the upper wall 40 of the head-up display device 12 and supports the front windshield glass 18 from a lower side in the vehicle up-down direction. The support portion 46 is provided with a joint portion 47 that joins the front windshield glass 18 to the cowl panel 22.

Further, at a center part 22B of the cowl panel 22 in the vehicle up-down direction, bent portions 48, 50 are provided so as to be arranged side by side in an up-down direction with respect to the cowl panel 22. The bent portions 48, 50 face the side wall 42 of the head-up display device 12 and are bent toward a front of the vehicle. The cowl panel 22 can be bent toward the front of the vehicle with the bent portions 48, 50 serving as starting points. As described above, the cowl panel 22 is provided with the bent portions 48, 50 and is bent with the bent portions 48, 50 serving as the starting points, so that an impact energy can be effectively absorbed with deformation of the cowl panel 22.

A lower part 22C of the cowl panel 22 is provided with a facing wall 52 facing the lower wall 44 of the head-up display device 12. The facing wall 52 is tilted downward in the vehicle up-down direction as extending toward a rear of the vehicle.

A lower part 24A of the bracket 24 described above is fastened to a rear end of the facing wall 52 of the cowl panel 22. An upper part 24B of the bracket 24 is welded to the upper end 28A of the dash panel 28. The lower wall 44 of the head-up display device 12 is provided with a step 44A in order to avoid interference with the upper part 24B of the bracket 24 and the upper end 28A of the dash panel 28. However, the step 44A is not necessarily required.

Figure 2:
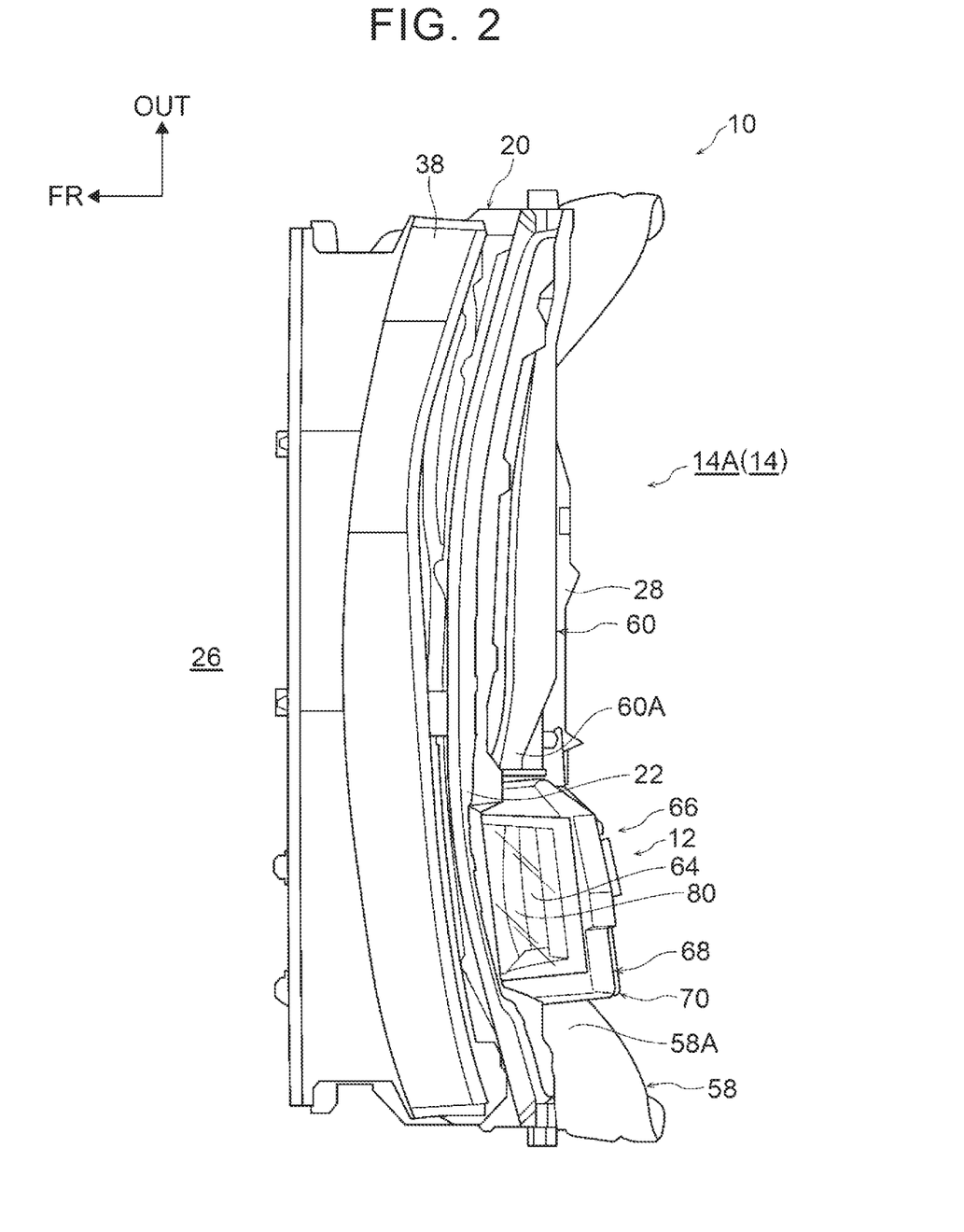
FIG. 2 is a plan view of the front part of the cabin of the vehicle on which the head-up display device according to the embodiment is mounted.

FIG. 2 shows a plan view of the front part 14A of the cabin 14 of the vehicle 10, with the instrument panel 16 and the front windshield glass 18 shown in FIG. 1 omitted. In FIG. 2, the vehicle 10 is a so-called left-hand drive vehicle, but may be a right-hand drive vehicle.

Figure 3:
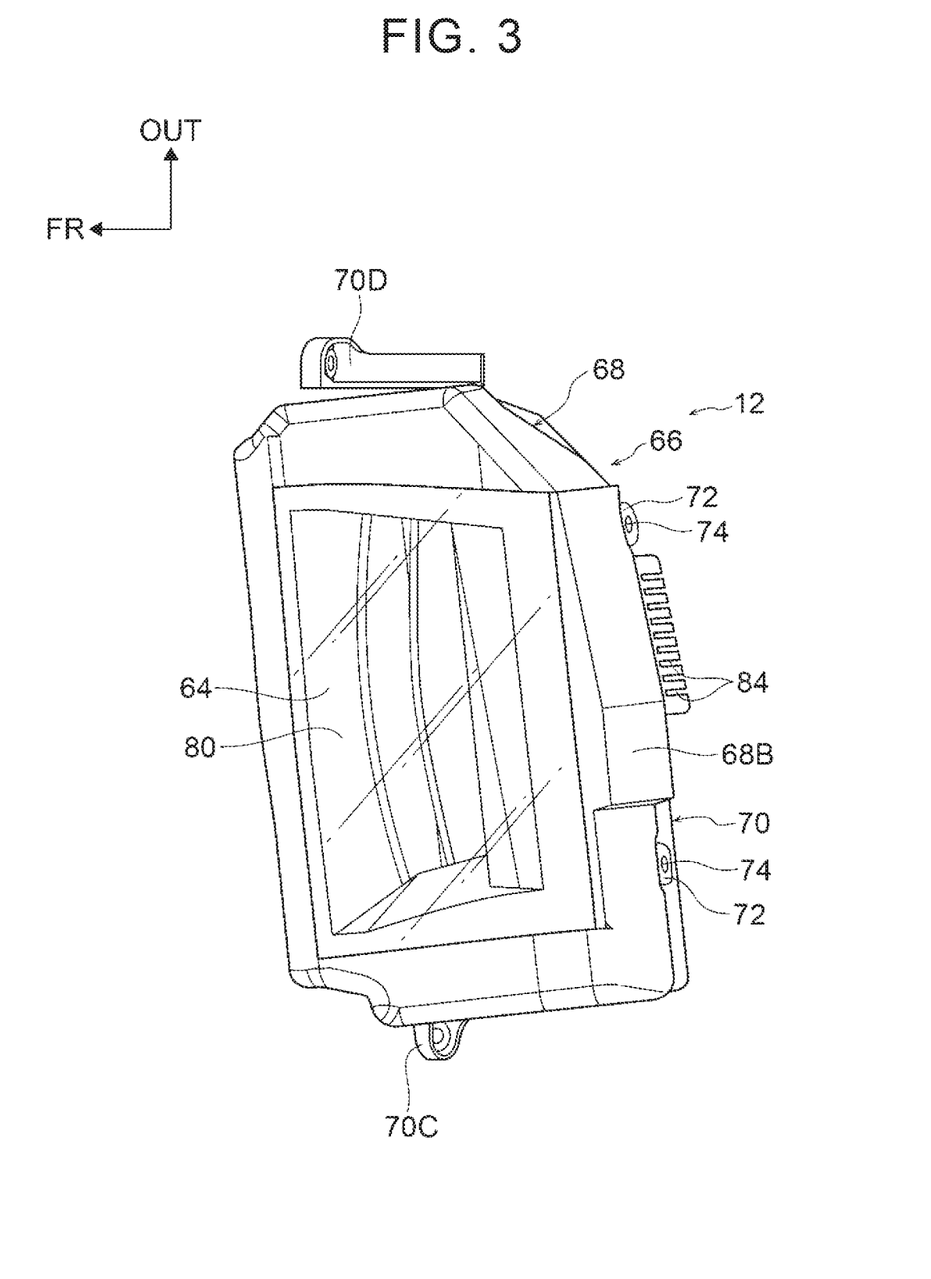
FIG. 3 is a plan view of the head-up display device according to the embodiment.

Here, as shown in FIG. 2, cowl reinforcements 58, 60 are provided on the rear side of the cowl panel 22 in the vehicle front-rear direction, while being separated from each other in the vehicle width direction with the head-up display device 12 interposed therebetween. The head-up display device 12 is fixed to first ends 58A, 60A of the cowl reinforcements 58, 60 in a longitudinal direction thereof via fixing portions 70C, 70D (see FIG. 3) described later and is fastened to the dash panel 28 via a bracket (not shown). FIG. 3 shows a plan view of the head-up display device 12.

As shown in FIG. 3, a lower case 70 of the head-up display device 12 is provided with the fixing portions 70C, 70D. Of the fixing portions 70C, 70D, the fixing portion 70C is fixed to the cowl reinforcement 58 (see FIG. 2) and the fixing portion 70D is fixed to the cowl reinforcement 60 (see FIG. 2), via fastening members such as bolts.

That is, in the present embodiment, the head-up display device 12 is fixed to (supported by) the cowl reinforcements 58, 60 and the dash panel 28 shown in FIG. 2. Note that the method of supporting the head-up display device 12 is not limited to this. For example, although not shown, the head-up display device 12 may be configured to be supported by the instrument panel reinforcement via a bracket or the like.

Configuration of Head-Up Display Device

Here, a configuration of the head-up display device 12 will be described.

In brief, the head-up display device 12 shown in FIG. 1 is configured such that vehicle information (hereinafter referred to as "image information") is emitted as an image from a light source unit (light source) 62 composed of LEDs and the like, and the image information is displayed as a virtual image on the front windshield glass 18 through a transmission glass 64 provided in the upper wall 40 of the head-up display device 12 and an opening 16A of the instrument panel 16.

A casing 66 of the head-up display device 12 includes an upper case 68 constituting an upper part 66A of the casing 66 and the lower case 70 constituting a lower part 66B of the casing 66. Each of the upper case 68 and the lower case 70 has a generally rectangular shape in a plan view, which is long in the vehicle width direction, and is made from resin.

As shown in FIG. 1, the upper case 68 includes the upper wall 40 constituting the upper wall 40 of the head-up display device 12 and a wall 42A extending down from an outer edge of the upper wall 40 and constituting an upper part of the side wall 42 of the head-up display device 12. The lower case 70 includes the lower wall 44 constituting the lower wall 44 of the head-up display device 12 and a wall 42B extending upward from an outer edge of the lower wall 44 and constituting a lower part of the side wall 42 of the head-up display device 12.

In the present embodiment, the wall 42A of the upper case 68 is formed such that a part thereof at the rear part 12B of the head-up display device 12 is longer than a part thereof at the front part 12A of the head-up display device 12. At the rear part 12B of the head-up display device 12, the wall 42A is provided with a bent portion 43 located above a center part thereof in the vehicle up-down direction and bent toward the front of the vehicle.

In the wall 42A of the upper case 68, the part at the rear part 12B of the head-up display device 12 is longer than the part at the front part 12A of the head-up display device 12. Thus, in the wall 42B of the lower case 70, a part at the rear part 12B of the head-up display device 12 is accordingly shorter than a part at the front part 12A of the head-up display device 12. However, it goes without saying that the shape of the wall 42A and the shape of the wall 42B may be substantially the same over a range from the front part 12A to the rear part 12B in the head-up display device 12.

In the present embodiment, an outer dimension of the upper case 68 is set to be slightly larger than that of the lower case 70 (described later). However, the wall 42A of the upper case 68 is disposed inward of the wall 42B of the lower case 70.

Figure 4:
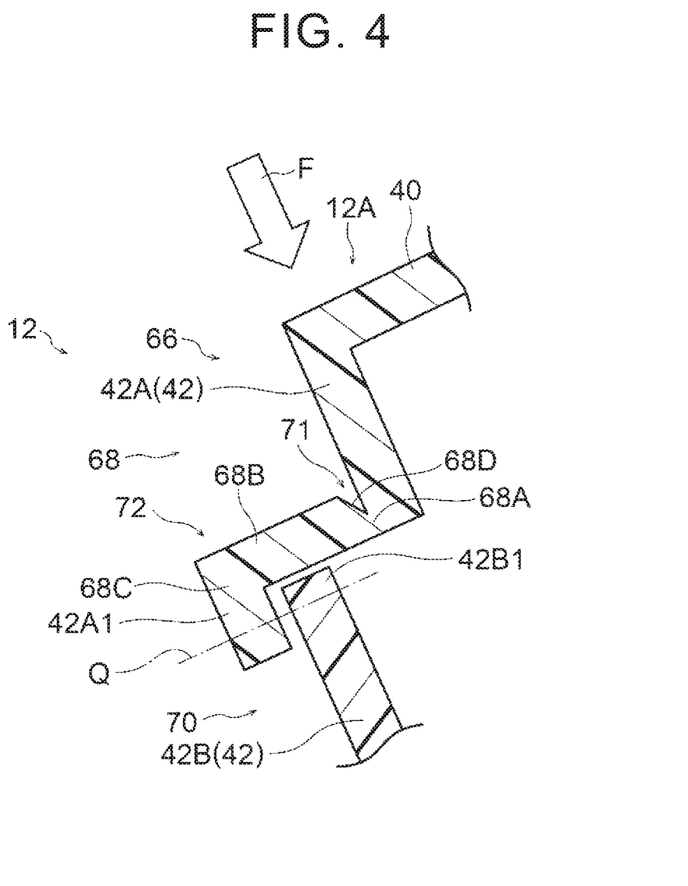
FIG. 4 is an enlarged sectional view of a main part of the head-up display device according to the embodiment.

Here, FIG. 4 shows an enlarged sectional view of a main part, in which the main part shown as part A in FIG. 1 is enlarged. As shown in FIG. 4, in the present embodiment, the wall 42A of the upper case 68 is disposed inward of the wall 42B of the lower case 70 (further inward of the casing 66), as described above. An upper end 42B1 of the wall 42B of the lower case 70 and a lower end 42A1 of the wall 42A of the upper case 68 are connected at a connecting portion 72. Further, a front part of the upper case 68 (front part 12A of the head-up display device 12) is provided with a thin portion (fragile portion) 68A formed so as to have a smaller plate thickness than other portions.

More specifically, at the connecting portion 72, a lateral wall 68B extends along a substantially horizontal direction and outward of the wall 42A (outward of the casing 66) from a lower edge of the wall 42A of the upper case 68, and the lateral wall 68B can be placed on an upper end of the wall 42B of the lower case 70. Further, a connecting piece 68C extends downward in the vehicle up-down direction from an end of the lateral wall 68B.

The connecting piece 68C overlaps the upper end 42B1 of the wall 42B of the lower case 70 from outside, and is connected to the upper end 42B1 of the wall 42B via a connecting tool such as screws 74 (see FIG. 3). A long dashed short dashed line Q in FIG. 4 indicates an axial center line of the screws 74 (see FIG. 3). The upper case 68 is fixed to the lower case 70 with the connecting piece 68C of the upper case 68 connected to the wall 42B of the lower case 70 via the screws 74 (see FIG. 3).

Further, in the present embodiment, a groove (fragile portion) 68D is provided in a boundary portion 71 between the lateral wall 68B and the wall 42A of the upper case 68. The groove 68D has a V-shaped section recessed downward in the vehicle up-down direction when cut along the vehicle front-rear direction and the vehicle up-down direction. The groove 68D is not limited to this shape, as long as the groove 68D can form the thin portion 68A with the smaller plate thickness than the other portions. For example, although not shown, the groove may be a semicircular groove, or may be a groove recessed in a square shape.

As shown in FIG. 1, the thin portion 68A is configured to be broken when an impact load F is input to the head-up display device 12 from the upper side in the vehicle up-down direction along a long dashed short dashed line P.

The impact load F is set based on, for example, the Pedestrian Head Protection Performance Tests defined in the Japan New Car Assessment Program (JNCAP). That is, a load that acts on (is input to) the front windshield glass 18 when a head impactor 76, which is a collision body simulating the head of an adult or child, is projected from a testing machine to collide with the front windshield glass 18 is defined as the impact load F.

The lower case 70 of the head-up display device 12 is provided with at least the light source unit 62, a flat mirror 78, and a concave mirror 80. The light source unit 62 and the flat mirror 78 are accommodated in an accommodating portion 82 provided in the lower case 70. The concave mirror 80 is disposed at the front part 12A of the head-up display device 12 and below the support portion 46 in a vehicle up-down direction that passes through the support portion 46 supporting the front windshield glass 18 and that extends along a load input direction (long dashed short dashed line P) of the head impactor 76.

Here, as shown in FIG. 3, the accommodating portion 82 of the head-up display device 12 is provided with a plurality of vent holes 84 that is configured to release heat in the accommodating portion 82. The vent holes 84 are closed by a sheet or the like (not shown) that can dissipate heat and suppress entry of dust and the like.

Further, in the head-up display device 12, the accommodating portion 82 is closed by a cover 86 so that dust does not enter the accommodating portion 82. The cover 86 is provided with a transmission glass 87 so as to transmit light. The light (image information) emitted from the light source unit 62 is refracted by the flat mirror 78, passes through the transmission glass 87, and is incident on the concave mirror 80 by a reflection mirror or the like (not shown).

The concave mirror 80 is made from highly transparent resin such as polycarbonate (PC) or glass. The light (image information) projected by the concave mirror 80 is transmitted toward the front windshield glass 18 as described above, and a virtual image is formed on the front windshield glass 18.

As described above, the lower case 70 of the head-up display device 12 is provided with the light source unit 62 that emits image information. Thus, a plate thickness, a material, and the like of the lower case 70 are set so as to obtain high rigidity in consideration of an influence of vibration and the like. That is, the lower case 70 is configured to have higher rigidity than the upper case 68.

Thus, the upper case 68 is formed so as to have a smaller plate thickness than the lower case 70, or is formed of a material having a Young's modulus lower than that of the material of the lower case 70. The upper case 68 may be formed so as to satisfy both of these. In the present embodiment, the upper case 68 and the lower case 70 are made from resin, but not limited to this. The upper case 68 and the lower case 70 may be made of metal. Furthermore, the lower case 70 may be made of metal, and the upper case 68 may be made from resin.

Operations and Effects of Head-Up Display Device

Next, operations and effects of the head-up display device 12 will be described.

As shown in FIG. 1, the head-up display device 12 is provided to an inside 17 of the instrument panel 16. The casing 66 of the head-up display device 12 is provided with the concave mirror 80 that projects the image information emitted from the light source unit 62 toward the front windshield glass 18.

Figure 5:
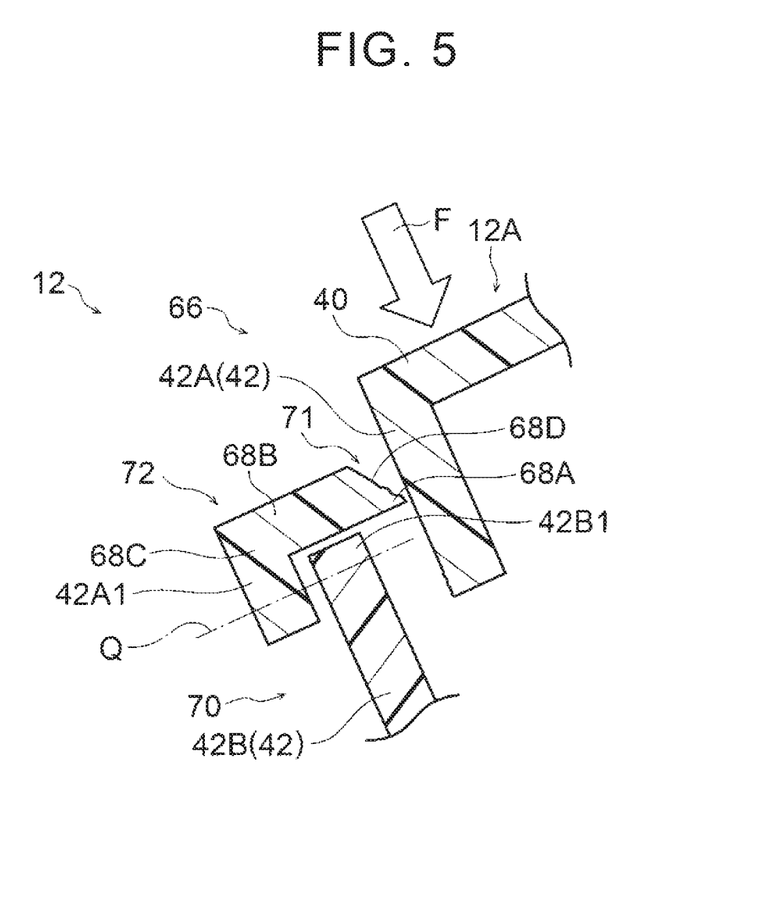
FIG. 5 is an enlarged sectional view, corresponding to FIG. 4, of the main part of the head-up display device according to the embodiment, to which an impact load is input.

In the present embodiment, as shown in FIGS. 4 and 5, the upper case 68 of the head-up display device 12 is provided with the groove 68D. The thin portion 68A formed by the groove 68D is broken when the impact load F is input to the casing 66 of the head-up display device 12 from above the vehicle. As shown in FIG. 1, the lower case 70 is provided with the light source unit 62 that emits the image information, and the lower case 70 is formed to have higher rigidity than the upper case 68.

Thus, the lower case 70 in which the light source unit 62 is provided is formed to have high rigidity, so that the head-up display device 12 can suppress jitters of the image information that occurs during traveling of the vehicle 10. In the present embodiment, as shown in FIG. 5, when the impact load F is input to the head-up display device 12 from above the vehicle, the upper case 68 receives a reaction force from the lower case 70 to be broken at the thin portion 68A.

Figure 6:
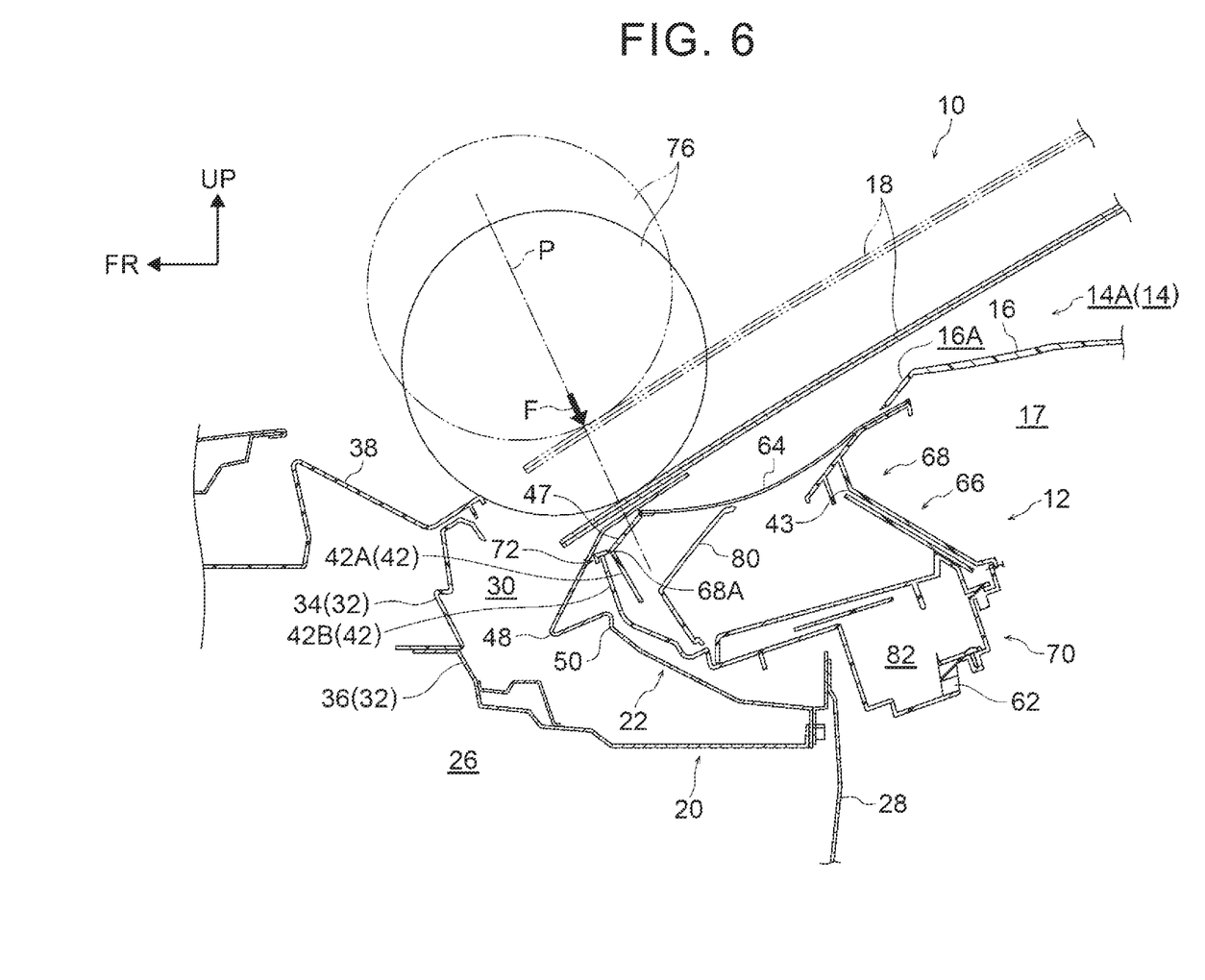
FIG. 6 is an operation diagram showing the front part of the cabin of the vehicle, on which the head-up display device according to the embodiment is mounted, before and after the impact load is input, taken along the vehicle up-down direction and the vehicle front-rear direction.

As a result, as shown in FIG. 6, the upper case 68 of the head-up display device 12 moves (crushes) downward in the vehicle up-down direction. Thus, the front windshield glass 18, the instrument panel 16, the cowl panel 22 and the like can move (deform) downward in the vehicle up-down direction without being intercepted by the upper case 68, thereby absorbing the impact energy.

From the above, in the present embodiment, the head-up display device 12 can suppress jitters of the image information during traveling of the vehicle 10, and absorb the impact energy when the impact load F is input from the upper side in the vehicle up-down direction. Thus, according to the embodiment, with the absorption of the impact energy, it is possible to reduce the reaction force to the pedestrian and to reduce the impact acting on the pedestrian.

In other words, in the present embodiment, the casing 66 of the head-up display device 12 can realize two contradictory performances, i.e., higher rigidity for suppressing jitters of the image information and lower rigidity for protecting pedestrians.

Here, FIG. 6 is an operation diagram showing the front part 14A of the cabin 14 of the vehicle 10 before and after the impact load F is input, taken along the vehicle up-down direction and the vehicle front-rear direction. Long dashed double-short dashed lines indicate a state before the input of the impact load F, and solid lines indicate a state after the input of the impact load F.

In FIG. 6, the concave mirror 80 is bent when the upper case 68 moves downward in the vehicle up-down direction. However, when the height of the concave mirror 80 is low, the concave mirror 80 moves downward in the vehicle up-down direction.

In the present embodiment, the thin portion 68A is formed as the fragile portion to have a smaller plate thickness than the other portions. Thus, with the thin portion 68A, a portion in which the thin portion 68A is formed has a smaller plate thickness, and accordingly has lower rigidity than the other portions. Thus, when the impact load F is input to the head-up display device 12 from above the vehicle, the thin portion 68A is broken.

In general, as shown in FIG. 1, the front windshield glass 18 is tilted toward the rear in the vehicle front-rear direction as extending upward in the vehicle up-down direction. Therefore, a distance H1 between the front windshield glass 18 and the front part 12A of the head-up display device 12 provided to the inside 17 of the instrument panel 16 (front part of the upper case 68) is shorter than a distance H2 between the front windshield glass 18 and the rear part 12B of the head-up display device 12.

Therefore, in the present embodiment, the thin portion 68A is provided at least in the front part 12A of the head-up display device 12. Thereby, although not shown, compared to the case where the thin portion 68A is provided in the rear part 12B of the head-up display device 12, the thin portion 68A can be broken at an early stage when the impact load F is input to the front windshield glass 18 from the upper side in the vehicle up-down direction.

That is, in the present embodiment, the front windshield glass 18, the instrument panel 16, the cowl panel 22 and the like can move (deform) downward in the vehicle up-down direction to absorb the impact energy at an early stage. Thereby, it is possible to reduce the impact that acts on the pedestrian.

Further, in the present embodiment, when the thin portion 68A provided at the front part 12A of the head-up display device 12 is broken, the wall 42A at the rear part 12B of the head-up display device 12 is bent toward the front of the vehicle with the bent portion 43 serving as a starting point, as shown in FIG. 6. That is, the front windshield glass 18, the instrument panel 16, and the cowl panel 22 move downward in the vehicle up-down direction without being intercepted by the upper case 68 of the head-up display device 12.

In particular, when the entire head-up display device 12 is covered with a metal such as the cowl panel 22 etc., it is difficult to move the entire head-up display device 12 downward in the vehicle up-down direction. Thus, with the configuration in which at least the upper case 68 moves (crushes) downward in the vehicle up-down direction, an effect of reducing the impact to the pedestrian's head is expected to be obtained.

As shown in FIGS. 1 and 4, in the present embodiment, the outer dimension of the upper case 68 of the head-up display device 12 is set to be slightly larger than the outer dimension of the lower case 70. However, the wall 42A of the upper case 68 is disposed inward of the wall 42B of the lower case 70.

Further, the upper end 42B1 of the wall 42B of the lower case 70 and the connecting piece 68C of the wall 42A of the upper case 68 are connected at the connecting portion 72, and the thin portion 68A is provided in the connecting portion 72. As shown in FIGS. 5 and 6, the thin portion 68A is configured to be broken when the impact load F is input to the casing 66 of the head-up display device 12 from above the vehicle.

As described above, the wall 42A of the upper case 68 is disposed inward of the wall 42B of the lower case 70, and the screws 74 are used to connect the upper end 42B1 of the wall 42B of the lower case 70 and the connecting piece 68C provided outward of the wall 42A via the lateral wall 68B of the upper case 68. Thus, when the groove 68D is broken, the upper case 68 moves toward the lower case 70 (downward in the vehicle up-down direction). That is, the casing 66 is crushed, which reduces the volume of the casing 66.

Thus, in the present embodiment, the groove 68D formed in the connecting portion 72 of the upper case 68 is broken and the volume of the casing 66 is reduced, so that the amounts of deformation (deformation strokes) of the front windshield glass 18, the instrument panel 16, the cowl panel 22, and the like can be increased, thereby increasing the amount of impact energy to be absorbed.

In the present embodiment, the upper case 68 is provided with the lateral wall 68B. The lateral wall 68B extends outward of the wall 42A along the horizontal direction from the lower end of the wall 42A of the upper case 68, and is placed on the upper end of the wall 42B of the lower case 70. Further, the connecting portion 72 that connects the lower case 70 and the upper case 68 is provided with the connecting piece 68C. The connecting piece 68C extends downward from the end of the lateral wall 68B, overlaps the wall 42B of the lower case 70 from outside to be connected via the screws 74. Further, the thin portion 68A is provided in the boundary portion 71 between the lateral wall 68B and the wall 42A of the upper case 68.

As described above, the thin portion 68A is provided in the boundary portion 71 between the lateral wall 68B and the wall 42A of the upper case 68. Thus, when the impact load F is input to the casing 66 of the head-up display device 12 from above the vehicle, stress can be concentrated on the thin portion 68A so that the thin portion 68A can be reliably broken.

Further, the boundary portion 71 is disposed on the inner side of the connecting portion 72. Therefore, when the thin portion 68A provided in the boundary portion 71 is broken and the upper case 68 moves downward in the vehicle up-down direction to cause the casing 66 to crush, the wall 42A of the upper case 68 can be restrained from interfering with the connecting portion 72. In other words, when the groove 68D is broken, the upper case 68 reliably moves downward in the vehicle up-down direction.

That is, in the present embodiment, when the impact load F is input from above the vehicle, the front windshield glass 18, the instrument panel 16, the cowl panel 22 and the like are effectively deformed, so that the impact energy can be reliably absorbed.

At the front part of the front windshield glass 18 in the vehicle front-rear direction, an injury index with respect to the pedestrian who collides with the front windshield glass 18 is higher at the joint portion 47 between the cowl 20 extending along the vehicle width direction and the front windshield glass 18 than at a portion other than the joint portion 47.

Thus, in the present embodiment, the head-up display device 12 is provided with at least the thin portion 68A below, in the vehicle up-down direction, the joint portion 47 joining the cowl panel 22 and the front windshield glass 18.

Accordingly, when the impact load F is input from above the vehicle to the casing 66 of the head-up display device 12 through the front windshield glass 18, the thin portion 68A of the upper case 68 is broken so that it is possible to promote deformation of the front windshield glass 18, the instrument panel 16, and the cowl panel 22 involving the joint portion 47.

That is, in the present embodiment, it is possible to restrain at least the upper case 68 of the head-up display device 12 from acting as a reaction force below, in the vehicle up-down direction, the joint portion 47 joining the front windshield glass 18 and the cowl panel 22, when the front windshield glass 18, the instrument panel 16, the cowl panel 22 and the like are deformed. Thereby, in the present embodiment, it is possible to reduce the reaction force with respect to the pedestrian, and thus reduce the impact that acts on the pedestrian.

Supplementary Description of the Present Embodiment

In the present embodiment, as shown in FIG. 4, the thin portion 68A is provided as the fragile portion, but the disclosure is not limited to this. For example, although not shown, notches or holes may be formed in the boundary portion 71. Further, the upper case 68 may be molded with two types of resins such that the boundary portion 71 and the portions other than the boundary portion 71 are molded with different types of resin that differ in rigidity.

In the present embodiment, in the casing 66 of the head-up display device 12, the upper case 68 includes the upper wall 40 and the wall 42A, and the lower case 70 includes the lower wall 44 and the wall 42B. However, the upper case 68 only needs to be movable downward in the vehicle up-down direction with respect to the lower case 70, so its shape, configuration, and the like are not limited to the above. For example, in the present embodiment, the wall 42A of the upper case 68 is disposed inward of the wall 42B of the lower case 70. However, the wall 42A may be disposed outward of the wall 42B of the lower case 70.

In the present embodiment, the thin portion 68A is provided at the front part of the upper case 68 (front part 12A of the head-up display device 12). However, the thin portion 68A may be provided over the entire circumference of the upper case 68.

Although the exemplary embodiment of the disclosure has been described above, embodiments of the disclosure is not limited to the above. An embodiment may be appropriately combined with various modifications, and needless to say, the disclosure can be carried out in various modes without departing from the scope of the disclosure.

What is claimed is:

1. A head-up display device comprising a casing provided inside an instrument panel, the casing including
   an upper case constituting an upper part of the casing and provided with a fragile portion that is configured to be broken when an impact load is input to the casing from an upper side in a vehicle up-down direction, and
   a lower case constituting a lower part of the casing, provided with a light source unit configured to emit image information, and having a rigidity higher than a rigidity of the upper case, wherein:
   the lower case has a first wall constituting a part of the lower case and extending along the vehicle up-down direction;
   the upper case has a second wall constituting a part of the upper case, extending along the vehicle up-down direction, and disposed further inward of the casing than the first wall; and
   the head-up display device further has a connecting portion at which an upper end of the first wall in the vehicle up-down direction and a lower end of the second wall in the vehicle up-down direction are connected and that is provided with the fragile portion.

2. The head-up display device according to claim 1, wherein the casing is provided with a concave mirror configured to project the image information emitted from the light source unit onto a front windshield glass.

3. The head-up display device according to claim 2, wherein at a front part of the front windshield glass in a vehicle front-rear direction, at least the fragile portion is provided below, in the vehicle up-down direction, a joint portion joining a cowl extending along a vehicle width direction and the front windshield glass.

4. The head-up display device according to claim 2, wherein the lower case accommodates the concave mirror.

5. The head-up display device according to claim 2, wherein the lower case is configured to accommodate a flat mirror disposed on a path of the image information, which extends from the light source unit that emits the image information to the concave mirror on which the image information is incident, the flat mirror being configured to refract the image information emitted from the light source unit.

6. The head-up display device according to claim 1, wherein the upper case has, as the fragile portion, a thin portion provided at least at a part of the upper case on a front side in a vehicle front-rear direction and having a plate thickness smaller than a thickness of a remaining part of the upper case.

7. The head-up display device according to claim 1, wherein:
   the connecting portion further includes a lateral wall extending outward of the second wall from the lower end of the second wall in the vehicle up-down direction and configured to be placed on the upper end of the first wall in the vehicle up-down direction, and a connecting piece extending downward from an end of the lateral wall and overlapping a surface of the first wall, which faces outward of the casing, to be connected to the first wall; and
   the fragile portion is provided at a boundary portion between the lateral wall and the second wall.

8. The head-up display device according to claim 1, wherein the lower case includes a fixing portion that is fixed to a cowl reinforcement of a vehicle.

* * * * *